Figure 1:
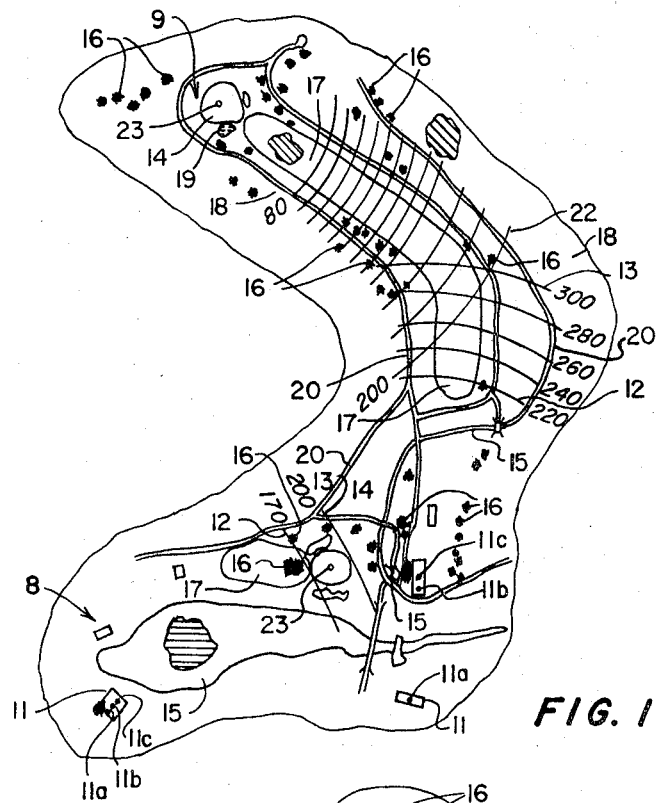

United States Patent

[11] 3,552,290

[72] Inventor Frederick Charles Brechtel
    919 Edinburgh Rd., SW, Calgary, Alberta, Canada
[21] Appl. No. 661,960
[22] Filed Aug. 21, 1967
[45] Patented Jan. 5, 1971

[54] SCALE MAP OF GOLF COURSE HOLES AND METHOD OF PRODUCING SAME
    6 Claims, 2 Drawing Figs.
[52] U.S. Cl. ................................................ 95/85
[51] Int. Cl. ........................................ G09b 25/08
[50] Field of Search ............................ 95/12.5, 85; 355/40, 52; 35/40

[56] References Cited
    UNITED STATES PATENTS
    1,199,610  9/1916  Reilly ........................... 35/40
    1,220,098  3/1917  Haas ............................ 35/40
    2,358,777  9/1944  Rappleyea .................... 95/125

Primary Examiner—John M. Horan
Attorney—McGrew and Edwards

ABSTRACT: A map of golf course hole layout produced as reproduction of one or plurality of aerial photographs by camera positioned at uniform distance from terrain along course showing each fairway and playing area between tee and green, said reproduction being substantially free from distortion throughout playing area with natural and artificial landmarks shown. Distance scale established by actual measurement along course represented by annotated indicia applied between two selected visible points used in measurement. Other indicia are applied to reproduction in arcuate pattern across playing area using indicated point on green as a center and in established scale distance units.

PATENTED JAN 5 1971

3,552,290

INVENTOR.
FREDERICK C. BRECHTEL
BY
ATTORNEYS

SCALE MAP OF GOLF COURSE HOLES AND METHOD OF PRODUCING SAME

This invention relates to a method of producing a scale map of a golf course hole layout, and the map produced thereby, and relates more particularly to such a map having color representation of natural objects.

Golfers require accurate knowledge of distances between the tee and natural and artificial landmarks along the hole being played in order to make proper club selection for the tee shot so as to avoid hazards along the intended line of flight of the shot and to obtain a desired position for the next shot. Similarly, on second and followup shots approaching the green an accurate knowledge of distance to the center of the green or the putting hole is required in order to make proper club selection.

Under prior practice, in the initial layout of the fairway, the center of the fairway is surveyed accurately using conventional surveying techniques. At a selected distance, such as 150 yards from an average putting hole position, a temporary reference stake is located on the fairway center line. A 90° right angle is turned at the stake with a transit and a permanent reference point is established on one edge of the fairway, which generally is a tree. Because of its lateral distance from the measured reference point on the fairway center line, such tree may be in error by as much as 10 or 15 feet in its relation to the putting hole location.

The whole basic technique of using such measurement is based on unsound estimating procedures. First, it is assumed that any point projected from the reference point perpendicular to the center line of the fairway is equidistant from the hole. This is obviously erroneous, for the locus of points equidistant from a given point (the hole) is the arc of a circle, not a straight line. For long distance references, such as 200 yards or more, the error introduced by this assumption may not have much significance but the error becomes greater as the distance to the hole becomes smaller.

In use, the golfer must recreate the 90° right triangle that was used to establish the reference point and project the reference point into the center of the fairway. Assuming the golfer accomplishes this accurately, he knows the point he has established is 150 yards from the hole. He then must locate his ball in reference to the 150 yard mark he has established and mentally compensate for the amount his ball is ahead or behind the imaginary mark. It becomes obvious that the estimated distance from the ball to the hole is grossly inaccurate.

Some golf courses provide draftsman's maps of the golf course layout showing the position of the holes and a fair representation of their shape with the approximate length of the hole shown, and in some cases such maps include representations of the position of traps, but most available landmarks are not shown and the maps not being drawn to scale do not provide much assistance in making proper club selection for a given shot.

My invention represents a departure from prior practice in utilizing reproductions of new aerial photographs of the entire golf course usually arranged as mosaics which may be black and white and preferably are reproduced in differential color representation of vegetation, trees, water areas, sand traps and paths. The photography involves having the camera at a preselected uniform distance from the terrain being photographed and in this way distortion-free pictures are obtained which may be reproduced in true scale.

Another innovation of my novel practice is the application of distance positions on the map reproduction between visible points or landmarks which are in scale determined by a measurement of the indicated position at surface level or other accurate measurement method. The mosaic is then annotated as to the hole number, total distance from the tee to the hole and par number. In addition, concentric arcs are annotated from an indicated position on the tee every 10 or 20 yards for the first 200 yards and every 50 yards from 200—300 yards. The golfer thus can determine accurately the distance to any doglegs in the fairway and the position of all traps, trees, etc. on or adjoining the playing area. He can make the decision whether to try and carry a trap or to play the ball short of the hazard. The annotated information negates the need to guess.

Similarly, concentric arcs are annotated from the hole every 10 or 20 yards for a distance of 250 yards. All that is needed is for the golfer to locate his ball relative to objects on the ground that are visible on the mosaic or reproductions. He may use as many points as he wishes to confirm his position precisely. The position can be determined to an accuracy of 3 feet or less. He only needs to interpolate to the nearest yard between the two adjacent annotated 10 yard arcs to obtain his true distance to the hole. The arcuate indicia applied to the reproduction preferably extends across the entire playing area.

It is an object of my invention to provide a simple, economical and efficient method of producing a scale map of a golf course hole layout with natural and artificial landmarks on and bordering the playing area of a hole depicted in accurate scale relationship.

Another object of my invention is to provide a map of a golf course hole layout as a color reproduction of aerial mapping with natural and artificial landmarks bordering and on the playing area between tee and green depicted in correct position and to scale.

A further object of my invention is to provide a true scale representation of a golf course hole layout in color representation depicting differentially vegetation, trees, sand traps, water areas and paths with annotated distance indicia related to some or most of said landmarks between tee and green as an aid in proper club selection for tee shots and for play to the green.

Other objects reside in novel details of construction and novel combinations and arrangements of components, all of which will be set forth in the following description.

The practice of my invention will be described with reference to the accompanying drawings in which like components bear similar reference numerals. In the drawings, FIG. 1 is an illustration of a two hole reproduction arrangement used in making the maps of my invention; and FIG. 2 is a single hole display arrangement.

Figure 2:
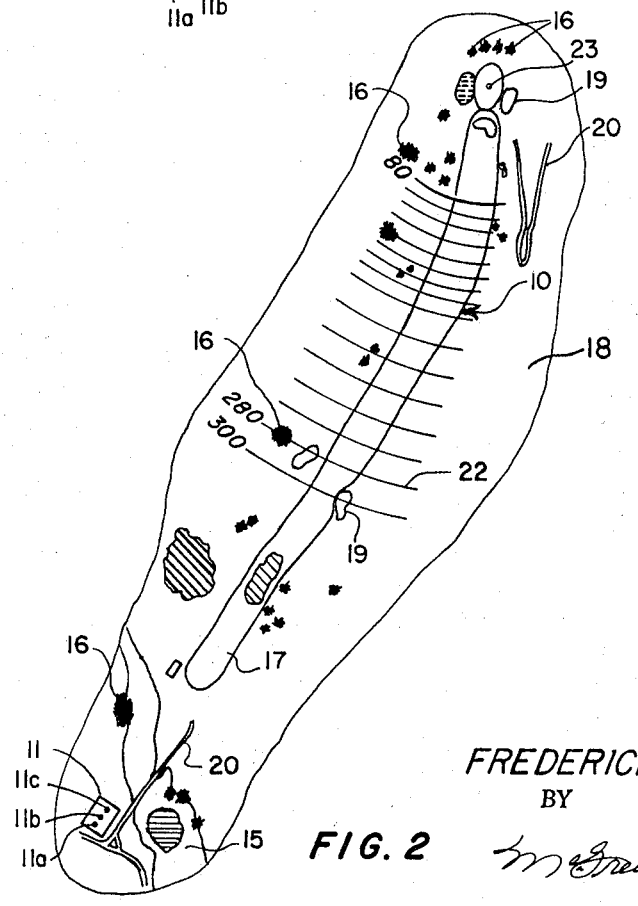

As shown in FIG. 1, the golf course arrangement has two consecutive holes in such close adjacency that one reproduction depicts the landmarks and scale of both holes. The tee 11 for the first hole 8 of the pair shows three positions in which the tee markers may be placed, i.e., back 11a, middle 11b and front 11c. The first hole is represented as a par 3 hole and hence the only distance indicia necessary for club selection is the indicia line or marker 12 at the front of the green 14 and the second indicia 13 at the rear of the green. Natural landmarks are shown such as the water area or pond 15 between tee and green, trees 16, fairway or mowed grass cover 17 and rough 18. Artificial landmarks, such as sand traps 19 and paths or roadways 20, also are shown.

As most of the hazards and landmarks are easily visible from tee 11, all the player requires in proper club selection on this hole is an accurate understanding of distance to the green. Indicia 12 and 13 are applied to the map from which the reproduction is made, usually as an overlay, and are located on the map by using an actual measure at ground level or equivalent to establish the scale. The points of actual measurement are used to draw the arcuate indicia with a compass using the back tee position 11a as the center. The arcuate indicia extend across substantially the entire playing area and in the event the tee shot fails to reach the green, such indicia can be related to landmarks adjacent the ball position to give the player an accurate measure of the distance of his next shot.

In FIG. 1, the second hole 9 employs two sets of indicia, the first including arcuate shorter 12 and longer 13 positions which again are based on a unit of length derived from actual measure at ground level, and the second comprising multiple positions 22 arranged at uniform units of the scale measurement representing one shot distances to the indicated hole position 23 on the green. If the player's tee shot is off the fairway as in the rough 18 where an accurate estimate of the distance to the hole 23 might be difficult, the ball position is easily related to one of the series of indicia 22 permitting the player to make his club selection with confidence that he will reach the green if his shot is normal.

FIG. 2 illustrates a single hole reproduction and is representative of the indicia arrangement for a par 5 hole. In this case, the indicia 22 are arcs on a center which is the hole 23 on the green, the most remote of which is 300 yards from hole 23. If the player does not reach the aforesaid remote position with his tee shot, he will know that whatever club best suits his requirement for the lie of the ball and clearing hazards ahead will not enable him to reach the green and hence distance need not be a factor in the selection. When the second or any subsequent shot puts the ball into the indicia area where distance becomes a factor in club selection, the player is then able to locate his ball position in relation to a given indicia 22 and make proper club selection for the distance shown.

The novel method of making reproductions accurate as to scale and relation to landmarks and playing areas of the course involves taking one or a plurality of aerial photographs with the camera aiming in essentially a vertical path while the aircraft is maintained at a preselected and uniform distance above ground through the pass over the terrain to be depicted which is not less than the airline distance from tee to green. Frequently, the flight path will be midway of the sides of the playing area of a selected hole, or where a photograph mosaic of the layout of the entire course is being used, the reproductions of selected holes will include the entire playing area between tee and green in true scale. This practice provides a final negative or print substantially free from distortion and with all existing natural and artificial landmarks shown from which reproductions are made.

Before making the reproductions, the indicia previously described are applied to the master copy. A correct scale for the indicia is established by an actual measurement at ground level between two points shown in the master copy or by photogrammetric measure, thus providing a unit of distance which is in true scale with the map being reproduced. Such measurement may involve a point on the tee to the center, front or back of the green or any combination thereof, if a par 3 hole, or from the tee position to an indicated point on the fairway, or from the hole on the green to an indicated point on the fairway or other landmark, if the hole is a par 4 or par 5. Preferably, the arcuate indicia will extend substantially across the entire playing area so as to be close to any visible landmark in such area. Finally, annotations of the correct distance designations are applied to each arcuate line of the indicia.

Next, the master copy is prepared for color reproduction which is shown by lining for color at selected areas of the drawings, which may be green for fairway and rough, a darker shade for trees, blue for water such as streams, ponds and the like, yellow for sand traps, or any other combinations which will give the color reproduction a realistic effect.

My method of calculations and annotation of the distances by use of a series of arcs drawn from the tee toward the green and a similar series of arcs of increasing radius from the center of the putting green toward the tee area is unique because when the golfers strike a ball, the direction of flight varies each time the hole is played. It is impossible to predict precisely the course the ball takes toward the objective putting hole.

Therefore, to determine the distance the ball has traveled or has to travel, the player must have a mental image of the entire playing area, and must be able to determine where the ball lies with reference to physical features of such image so that by rapid reference to all objects surrounding the ball position, he can determine the true position of the ball.

Then by reference to the annotated series of arcs he can determine the scaled arc which passes nearest to his ball position and by relating it to the indicated putting hole position as shown by the map, he can make the correct club selection to cause the ball to travel the known distance to the hole, which is the shortest distance between the two points involved in the mental measurement.

Preferred procedures for producing the map, and preferred arrangements of the components of the map have been set forth in the foregoing description. Other changes and modifications may be availed of within the spirit and scope of the hereunto appended claims.

I claim:

1. The method of producing a map of the layout of a golf course which comprises photographing the playing portion of a golf course including the tee, fairway, rough and green associated with at least one selected hole of play of said golf course from a predetermined uniform elevation above the course with an essentially vertical camera position so as to obtain a photographic print substantially free from distortion and with all existing natural and artificial landmarks along the portion of said golf course photographed, making a reproduction of said print, determining the distance between two selected points along the portion of said golf course photographed by measurement in true scale, establishing a unit of distance in scale related to said reproduction from said first measurement, applying a first indicia of the distance between the two selected points on the reproduction in correct scale relation, applying other indicia to the reproduction in arcuate pattern using a visible point on the green representation as a center and with said arcuate pattern extending substantially across the width of the playing area inclusive of the fairway and rough so as to relate to adjoining landmarks, and applying distance annotations to at least a portion of said other indicia in actual scale relation.

2. A method as defined in claim 1, in which one of the selected points is an indicated point on the tee of the portion of said golf course photographed and is used as a focus for applying the first indicia.

3. A method as defined in claim 1, in which the reproduction is in color differentiation between vegetation, trees, water areas, sand traps and paths.

4. A method as defined in claim 1, in which all arcuate indicia of the reproduction are annotated in distances of said scale unit.

5. A method as defined in claim 1, in which two series of arcuate indicia are applied to the reproduction between tee and green, one having an indicated point on the tee as a focus and the other having an indicated point on the green as the focus.

6. A method as defined in claim 1, in which the determination of the scale unit of the reproduction is based on ground level measurement of the distance between two points visible in the reproduction.